Dec. 13, 1960     W. H. MITCHELL ET AL     2,964,013
FLUID-PRESSURE FEED MECHANISM

Filed Jan. 20, 1959     2 Sheets-Sheet 1

United States Patent Office 2,964,013
Patented Dec. 13, 1960

2,964,013

FLUID-PRESSURE FEED MECHANISM

William Hector Mitchell and James Patterson Mitchell, both of 9 Hackett St., Ultimo, New South Wales, Australia Filed Jan. 20, 1959, Ser. No. 787,980

Claims priority, application Australia Jan. 22, 1958

6 Claims. (Cl. 121—38)

This invention relates to fluid pressure feed mechanisms and more particularly to such a mechanism adapted to actuate the tool or work-piece feed member of a production unit.

The term "production unit" is used to define any apparatus or mechanism in which a tool is advanced and/or retracted in relation to a work-piece, or a work-piece is advanced or retracted in relation to a tool.

By way of example, a typical production unit is a vertical drilling machine which commonly comprises a column having an adjustable work table, above which the upper end of the column carries the drilling head comprising a source of rotary motion, such as an electric motor, from which power is transmitted to a quill slidably and rotatably mounted in a housing in which the quill is endwise displaced by means such as a rack and pinion manually actuated by a capstan bar. At the lower end of the quill a tool holder, such as a drill chuck is secured so that a drill held in the chuck can be advanced to or retracted from a work-piece supported on the work table.

It will be readily understood that for repetition work continuous manipulation of the capstan bar, in the example given, can cause considerable fatigue to the operator with consequential inefficiency. Also, irregular rates of feeding the drill into the work-piece, especially drills in the smaller diameter range, can result in drill drift, rapid deterioration of the drill cutting edge and drill breakage. The latter defect is mostly prominent at the moment the work-piece is pierced by the drill.

The principal object of the present invention is to provide a fluid pressure feed mechanism by which the foregoing and other comparable disadvantages associated with manually actuated feeding mechanisms, are substantially removed.

Another object of the invention is to provide a fluid pressure feed mechanism in which fluctuation in the feed load is compensated by variation in the feed pressure.

A further object of the invention is to provide a mechanism as defined, in which detached or periodic strokes are selectively obtained.

A still further object of the invention is to provide a mechanism as defined which can be utilised in parallel with manually actuated feeding means.

Accordingly, in a general form the present invention is a fluid pressure feed mechanism comprising a cylinder having a piston slidable therein, a piston-rod secured to the piston and having its free end extending beyond the cylinder, a crosshead affixed to the free end of the piston rod, the said crosshead being adapted for attachment to a displaceable member, means for affixing the cylinder to a fixed member, a first valve means controlling the supply of fluid under pressure to the cylinder, the said first valve means being actuated by a striker moving with the piston rod, second valve means incorporating a restrictable inlet passage and a quick release exhaust passage, the said second valve means being serially connected in the fluid pressure line between the first valve means and the cylinder, a third valve means incorporating a divertor valve and a manual relief valve and associated with the first valve means and functional passages and conduits for fluid flow interconnecting the said valves and cylinder.

A specific embodiment of the invention will now be described in relation to a vertical drilling machine and with reference to the accompanying drawings wherein.

Figures 1, 2:
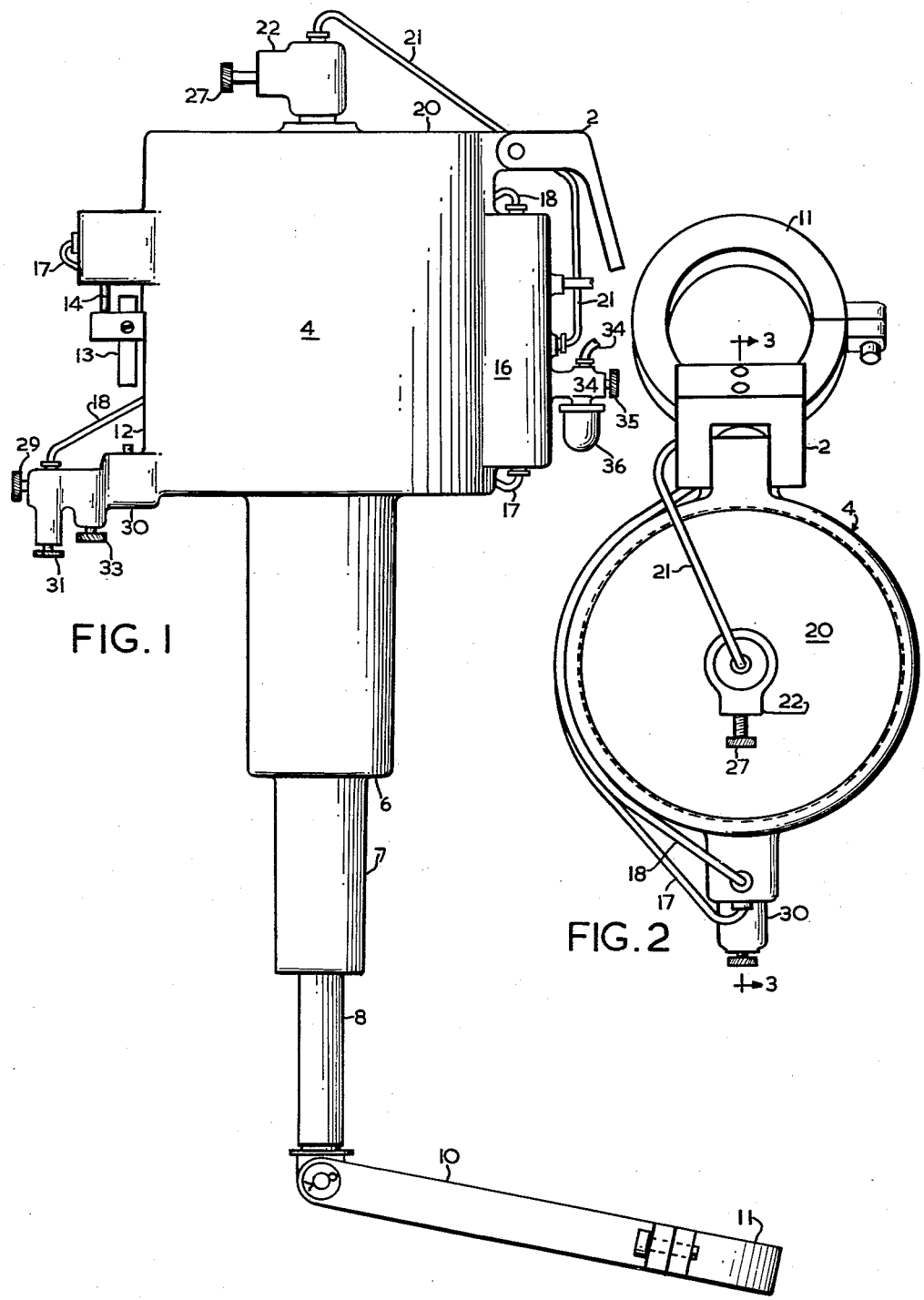
Figure 1 is an elevation of the mechanism.
Figure 2 is a plan view of the mechanism shown in Figure 1.
Figure 3:
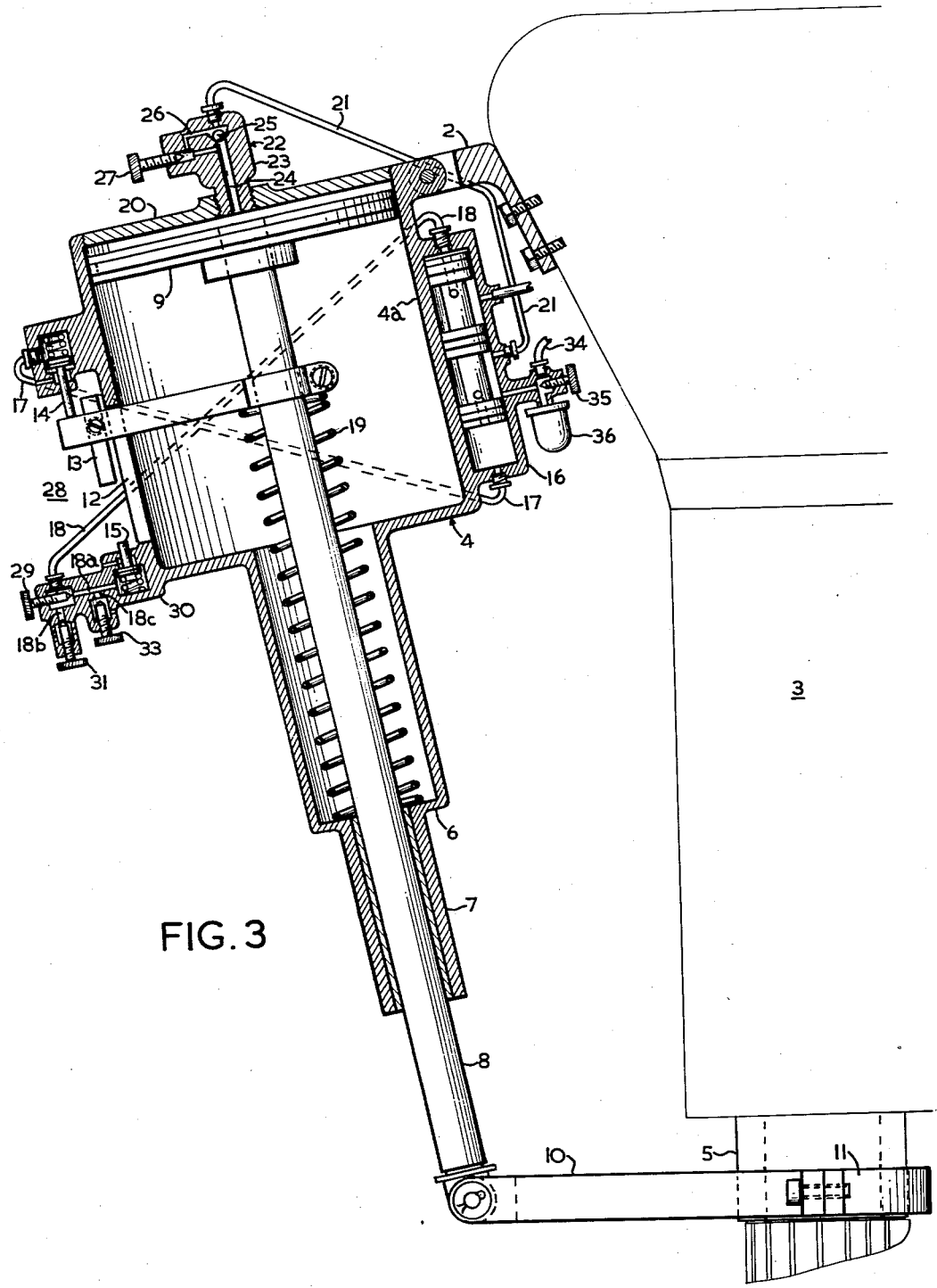
Figure 3 is a part section of the mechanism of Figure 2 taken at 3—3.

Accordingly, in the application of a fluid pressure feed mechanism in compliance with the present invention to a vertical drilling machine, use is made of a fluid motor 4 having a cylinder 4a the axis of which is disposed in the same vertical plane as the axis of the drill spindle 5 to which the drill chuck is attached.

The cylinder 4a near its upper and closed end is carried in a bracket 2 detachably and pivotally secured to the housing 3 of the said spindle 5, and at its lower end is provided with a cover plate 6 in which an axial passage forms a guiding slideway 7 for a piston-rod 8 extending from a piston 9 slidable in the upper part of the cylinder 4.

The free end of the piston-rod 8 has a crosshead 10 pivotally secured to a bracket 11 affixed to the quill of the said spindle 5 of the drilling head.

Beyond the portion of the cylinder 4a operably traversed by the piston 9 the wall of the cylinder is provided with an elongated slot 12 through which a striker stud 13 adjustably affixed to the piston rod 8 radially extends.

At or near each end of the said slot shift or pressure relief valves 14 and 15 forming part of the first valve means are mounted so that they are alternately actuated by reciprocation of the striker stud 13.

The first valve means comprises a fluid control valve 16 generally in accord with Australian Patent No. 162,-239 wherein a piston type spool valve moves in one direction in a cylinder to connect a supply of fluid pressure port to the operative side of a fluid motor piston and moves in the opposite direction to connect an exhaust passage to said motor, the said control valve 16 being actuated by relieving the pressure of the fluid alternately at the respective ends of the valve piston by means of valves 14 and 15 connected directly or remotely by conduits 17 and 18 to the control valve 16.

In accordance with the embodiment of the present invention being described the fluid motor 4 is single acting the return stroke of the piston 9 being effected by resilient means such as a compression spring 19, counterweight or the like.

The cylinder head 20 of the fluid motor 4 is connected to the pressure fluid outlet port of the first valve means by a conduit 21 in which the second valve means 22 is serially interposed.

The second valve means 22 comprises a valve body 23 having a main passage 24 therethrough. This main passage is counterbored for part of its length from its end to which the conduit 21 is connected, the inner end of the counterbore forming a seating for a ball 25, thereby providing a ball-valve giving free flow of fluid from the cylinder outwards.

The ball 25 is by-passed by a branch passage 26 connecting the respective ends of the main passage the area of the said branch passage being restrictable by means of a manually adjustable closure 27.

The third valve means 28 comprises a valve body 30 having an inlet port connected by conduit 18 to the end of the first valve means 16 that is actuated to initiate a power stroke in the fluid motor 4.

A passage 18a in the body 30 communicates between the said inlet port and the pressurized side of snift or relief valve 15 the said passage 18a having a branch passage 18b.

The branch passage 18b is connected to a manually actuated relief valve 31 the valve screw 29 serving to close the passage 18a to the relief valve 15 so that the first valve means 16 can be actuated by manually operated valve 31 to initiate the power stroke of motor 4.

The passage 18a has a second branch passage 18c leading to atmosphere, the passage being normally closed by valve screw 33. This passage 18c provides a means for emergency release of pressure from the fluid motor 4, when screw 33 is turned to open the passage.

From the foregoing it may now be seen that when the mechanism is arranged for periodic operation the reciprocation of the piston 9 and the piston rod 8 will displace the drill spindle 5 downwardly in a power stroke and on the snift valve 15 being actuated by the striker 13 the drill spindle will be retracted by the return thrust of the spring 19 or the like, on the piston.

The speed, or number of strokes per minute of the mechanism is regulated by opening or closing the by-pass 26 in the second valve means 22 the return or retracting stroke always being rapid through the clear passage past the ball-valve 25 not restricting the exhaust fluid flow from the cylinder.

The connection to the source of fluid supply under pressure generally indicated at 34 is provided with a manually adjustable stop valve 35 and filtering means 36 of conventional type.

It will be apparent that sensitivity in a drilling or other operation is provided by the construction and function of the second valve means 22, which provides for resiliency in the rate of feed most suitable for various sizes of drills and for different grades and types of work-pieces.

It will also be apparent that by adjustment of the stroke, a series of blind holes of regular depth can be drilled in a repetitive manner in a work-piece when employing the mechanism of this invention.

Also, considerable advantage is found in the use of the mechanism with a tapping attachment especially when tapping blind holes.

By removal of the holding screws the mechanism can be quickly secured to or removed from its mounting brackets and the mechanism does not interfere with the normal displacement of the drill spindle by the customary manually operated capstan or the like.

What we claim is:

1. A fluid pressure feed mechanism comprising a cylinder having a piston slidable therein, a piston-rod secured to the piston and having its free end extending beyond the cylinder, a crosshead affixed to the free end of the piston rod, the said crosshead being adapted for attachment to a displaceable member, means for affixing the cylinder to a fixed member, a first valve means controlling the supply of fluid under pressure to the cylinder, the said first valve means being actuated by a striker moving with the piston rod, second valve means incorporating a restrictable inlet passage and a quick release exhaust passage, the said second valve means being serially connected in the fluid pressure line between the first valve means and the cylinder, third valve means incorporating a divertor valve and a manual relief valve associated with the first valve means, and functional passages and conduits for fluid flow interconnecting the said valves and cylinder.

2. A fluid pressure feed mechanism as in claim 1 wherein the striker on the piston-rod alternately abuts to and actuates pressure relief or snift valves connected to each other and to the respective ends of a fluid control valve, the said snift valves and control valve constituting the first valve means.

3. A fluid pressure feed mechanism as in claim 2 wherein the pressure fluid supply conduit to the cylinder incorporates a manually adjustable needle valve in a valve body, the said needle valve controlling an inlet passage to the cylinder, the said passage being a by-pass around a normally closed ball-valve adapted to permit rapid exhaust of the cylinder, the said arrangement constituting the second valve means.

4. A fluid pressure feed mechanism as in claim 3 wherein a valve body having inlet and outlet ports forms with fluid diverting passages therein a divertor valve, the said ports being respectively connected to the source of pressure fluid supply from the snift valves and to a manually actuated release valve, the said passages being controlled by a manually adjustable member mounted in the valve body for the purpose of selective control, the said arrangement constituting the third valve means.

5. A fluid pressure feed mechanism as in claim 4 wherein the third valve means includes an emergency relief valve.

6. A fluid pressure feed mechanism as in claim 1 wherein the operating cylinder is double-acting.

No references cited.